United States Patent
Cha (10) Patent No.: US 7,031,375 B2
(45) Date of Patent: Apr. 18, 2006

(54) APPARATUS FOR GENERATING TERNARY SPREADING CODES WITH ZERO CORRELATION DURATION AND METHOD THEREFOR

(75) Inventor: Jae Sang Cha, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 637 days.

(21) Appl. No.: 10/022,730

(22) Filed: Dec. 20, 2001

(65) Prior Publication Data

US 2003/0016733 A1    Jan. 23, 2003

(30) Foreign Application Priority Data

Jun. 11, 2001    (KR) .............................. 2001-32445

(51) Int. Cl.
*H04B 1/69* (2006.01)
*H04B 1/707* (2006.01)
*H04B 1/713* (2006.01)

(52) U.S. Cl. .................... 375/149; 375/140; 375/147

(58) Field of Classification Search ............. 375/130, 375/140, 145, 149

See application file for complete search history.

(56) References Cited

U.S. PATENT DOCUMENTS 5,724,383 A * 3/1998 Gold et al. ............... 375/141

(Continued)

FOREIGN PATENT DOCUMENTS

KR     2000-39210     7/2000

OTHER PUBLICATIONS

Cha, et al.; New binary sequences with . . . ; Electronics Letters, May 25, 2000, vol. 36, No. 11, p. 1-2.
Suehiro; *A Signal Design without* . . . ; *IEEE Journal* on Selected Areas in Communications, vol. 12, No. 5, Jun. 1994, p. 837-841.

(Continued)

*Primary Examiner*—Stephen Chin
*Assistant Examiner*—Erin M. File
(74) *Attorney, Agent, or Firm*—Mayer, Brown, Rowe & Maw LLP (57) ABSTRACT

Ternary spreading codes in which side lobes near a peak of auth-correlation and cross-correlation are zero for a duration equal to or less than (0.75N+1) chips for a N chip period code are generated. The ternary spreading codes of the present invention is generated by (a) generating ternary zero correlation duration preferred pair codes, in which the zero correlation duration of (0.75N+1) chips is retained, by expanding a N chip period of a code, N being a natural number; and (b) generating a plurality of ternary zero correlation duration code sets having zero correlation characteristic equal to or less than (0.75N+1) chips by shifting the generated ternary zero correlation duration preferred pair codes in chips.

21 Claims, 5 Drawing Sheets

U.S. PATENT DOCUMENTS

| | | | | |
|---|---|---|---|---|
| 5,790,591 | A * | 8/1998 | Gold et al. | 375/142 |
| 6,212,566 | B1 * | 4/2001 | Vanhoof et al. | 709/230 |
| 6,574,268 | B1 * | 6/2003 | Bergamo | 375/142 |
| 2001/0024467 | A1 * | 9/2001 | Eto | 375/150 |
| 2002/0122463 | A1 * | 9/2002 | Li | 375/140 |

OTHER PUBLICATIONS

Saito, et al.; *New Quasi-Synchronous Sequences . . .* ; IEICE *Trans* Fundamentals, vol. E81-A, No. 11, Nov., 1998, p. 2274-2279.

Cha; Class of *ternary spreading . . .* ; *Electronics Letters*, May 10, 2001, vol. 37, No. 10, p. 636-637.

\* cited by examiner

APPARATUS FOR GENERATING TERNARY SPREADING CODES WITH ZERO CORRELATION DURATION AND METHOD THEREFOR

FIELD OF THE INVENTION

The present invention relates to an apparatus for generating ternary spreading codes with zero correlation duration and a method therefor; and, more particularly, to an apparatus for generating ternary spreading codes with zero correlation duration to have a large number of spreading codes with zero correlation characteristic, which are orthogonal over wide time duration, a method therefor, and a computer readable recording medium for recording a program for implementing the method.

PRIOR ART OF THE INVENTION

Generally, in a code division multiple access (CDMA) system, a channel from a base station to a mobile station is referred to as a down-link and a channel from the mobile station to the base station is referred to as an up-link.

In the CDMA system, the mobile station and the base station use Walsh code or Hadamard code as a spreading code having orthogonal characteristic. However, the orthogonal characteristic of such orthogonal codes can be retained only if synchronization is acquired between the spreading codes. That is, if synchronization acquisition is missed even a little, the orthogonal characteristic cannot be obtained.

Therefore, the orthogonal code should be used under the condition of synchronization acquisition. Furthermore, multiple access in the up-link leads to co-channel interference and delayed waves due to multi-path cause degradation of the orthogonal characteristic. From these problems, system performance is deteriorated.

Therefore, there have been studied to search spreading codes that retain the orthogonal characteristic for desired time duration. Recently, QS (OG-r) that are constructed by a combination of orthogonal Gold codes has been proposed as such spreading codes, but they have a problem in that the number of codes that can be obtained when the zero correlation duration is long becomes too small to accomplish the code division multiplexing. Thus, in order to resolve the above problem, binary zero correlation duration (ZCD) codes have been suggested, which have zero correlation duration of (0.5N+1) chips to the utmost and are capable of obtaining more spreading codes then the QS (OG-r). However, in the other way, the maximum zero correlation duration of (0.5N+1) chips is a weak point of the binary ZCD code.

SUMMARY OF THE INVENTION

Therefore, it is an object of the present invention to provide an apparatus for generating ternary spreading codes in which side lobes near auth-correlation peak and cross-correlation are zero for a duration equal to or less than (0.75N+1) chips when the code period is N chips, a method therefore, and a computer readable recording medium for recording a program for implementing the method.

In accordance with one aspect of the present invention, there is provided a method for generating ternary spreading code for use in an apparatus for generating the ternary spreading codes with zero correlation duration, the method comprising the steps of: (a) generating a ternary zero correlation duration preferred pair codes, in which the zero correlation duration of (0.75N+1) chips is retained, by expanding a N chip period a code, N being a natural number; and (b) generating a plurality of ternary zero correlation duration code sets having zero correlation characteristic equal to or less than (0.75N+1) chips by shifting the generated ternary zero correlation duration preferred pair codes in chips.

Further, in accordance with another aspect of the present invention, there is provided a apparatus for generating ternary spreading codes with zero correlation duration, the apparatus comprising: a generator for generating ternary zero correlation duration preferred pair codes, in which the zero correlation duration of (0.75N+1) chips is retained, by expanding a N chip period of a code, N being a natural number; and a generator for generating a plurality of ternary zero correlation duration code sets having zero correlation characteristic equal to or less than (0.75N+1) chips by shifting the generated ternary zero correlation duration preferred pair codes in chips.

Further, in accordance with still another aspect of the present invention, there is provided a computer readable recording medium for recording a program for implementing, in an apparatus having a processor for generating ternary spreading codes with zero correlation duration the functions of: (a) generating ternary zero correlation duration preferred pair codes, in which the zero correlation duration of (0.75N+1) chips is retained, by expanding a N chip period of a code, N being a natural number; and (b) generating a plurality of ternary zero correlation duration code sets having zero correlation characteristic equal to or less than (0.75N+1) chips by shifting the generated ternary zero correlation duration preferred pair codes in chips.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Figure 1:
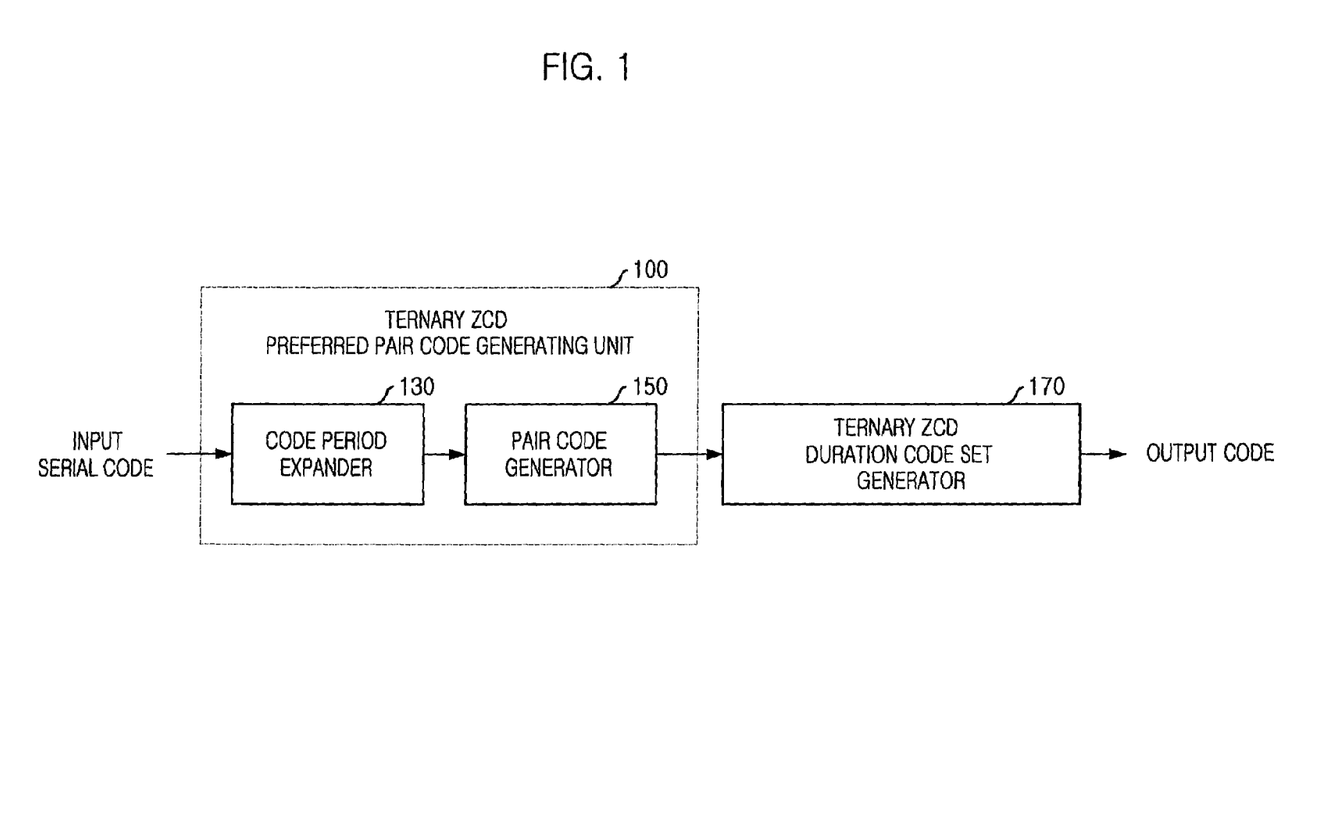
FIG. 1 shows a block construction diagram of an embodiment, for explaining procedure of generating ternary spreading codes with ZCD (zero correlation duration) in accordance with the present invention.
Figure 2:
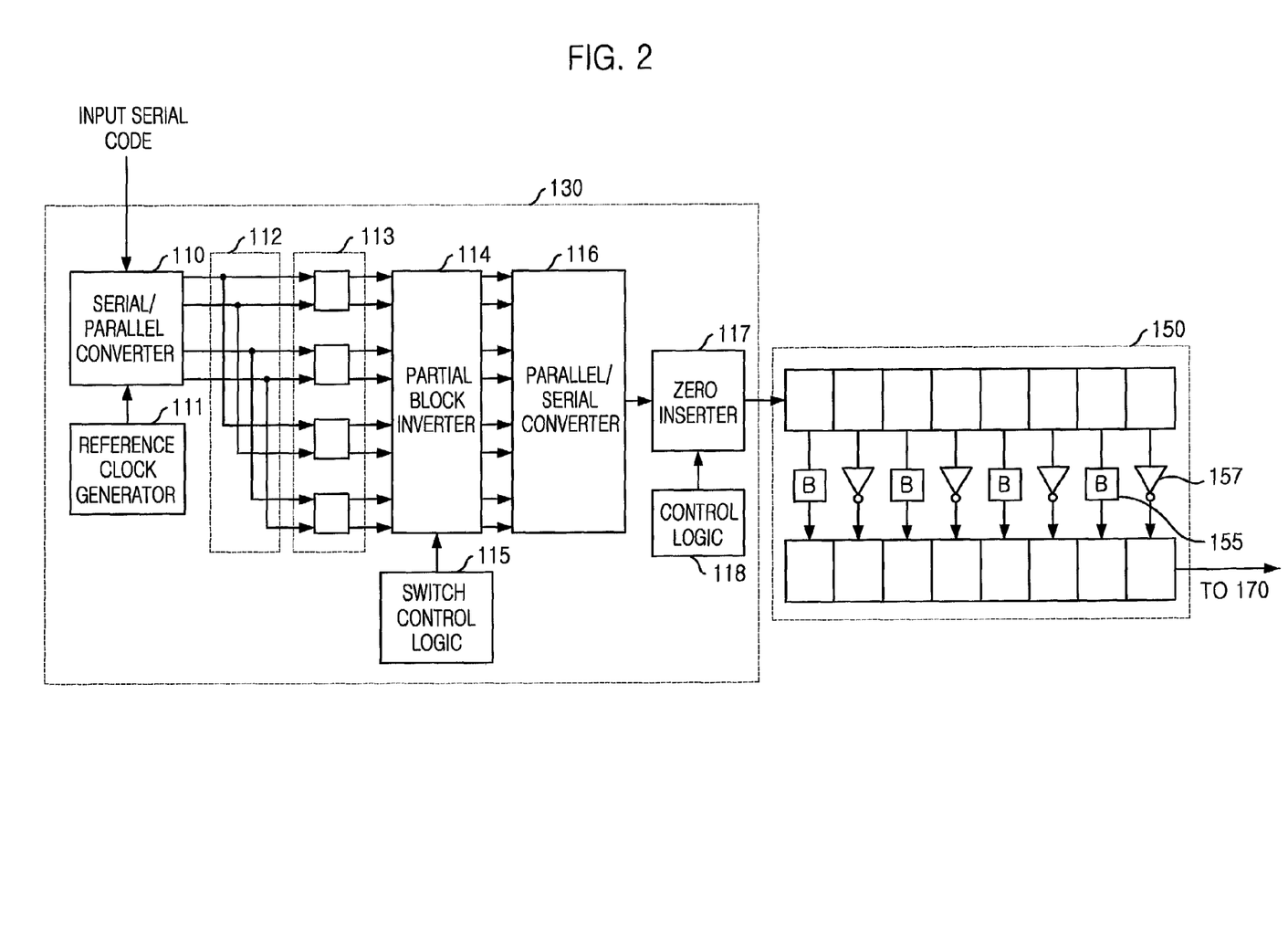
FIG. 2 shows a block construction diagram of an embodiment of a ternary ZCD preferred pair generating unit in FIG. 1.
Figure 3:
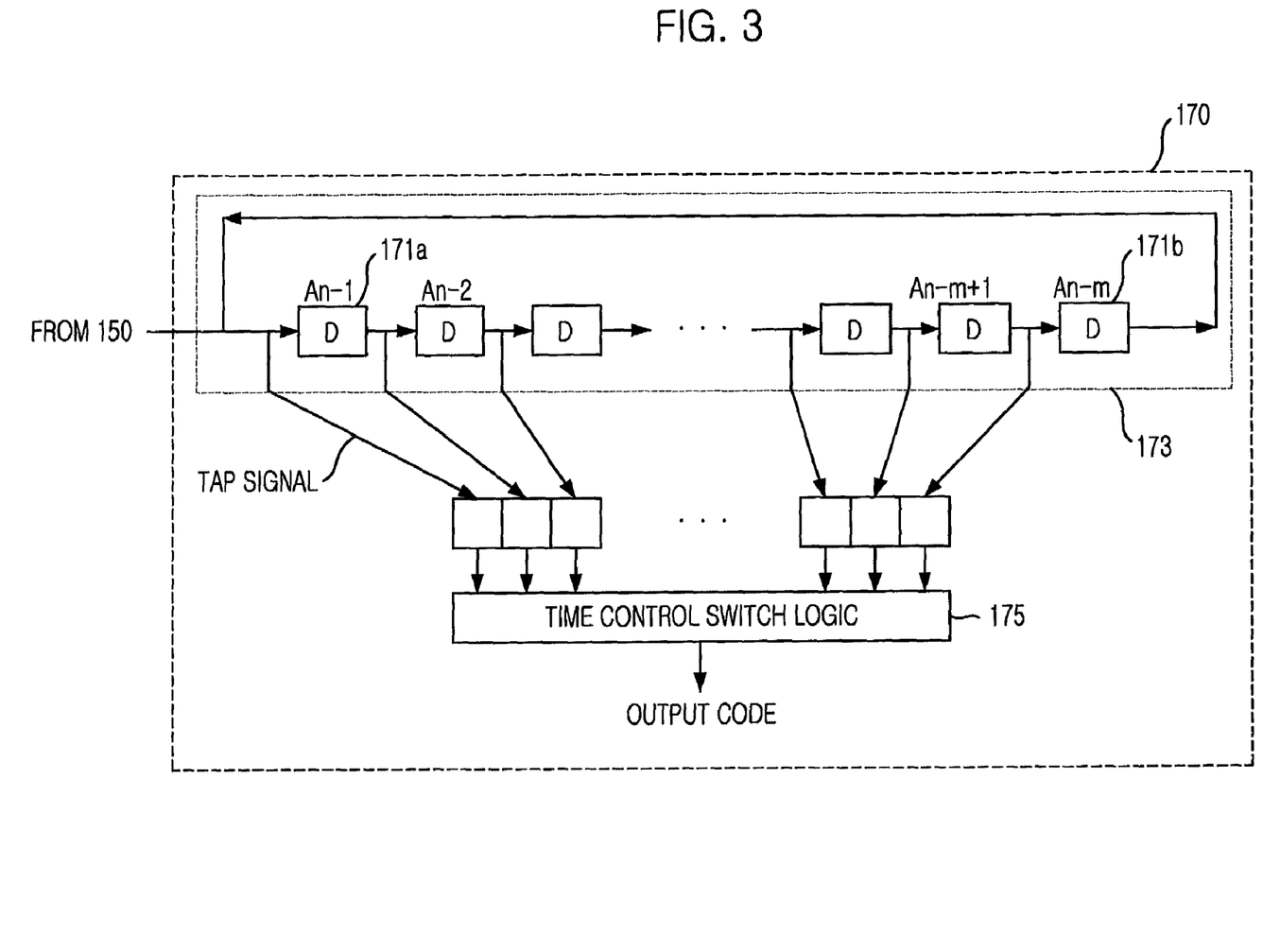
FIG. 3 offers a detailed block diagram of an embodiment of a ternary ZCD code set generator in FIG. 1.

FIGS. 1 to 3 show block construction diagrams of an embodiment, for explaining an apparatus for generating ternary spreading codes with zero correlation duration (ZCD) and the method therefor in accordance with the present invention.

As shown in FIGS. 1 to 3, the ternary spreading code generating apparatus comprises a ternary zero correlation duration (ZCD) preferred pair code generating unit 100 for generating ternary ZCD preferred pair codes, in which zero correlation characteristic is retained, by expanding a N chip period of a code, N being a natural number, and a ternary ZCD code set generator 170 for generating a set of ternary zero correlation duration codes by shifting the generated ternary ZCD preferred pair codes in chips.

The ternary ZCD preferred pair generating unit 100 includes a code period expander 130 for expanding a period of a basic spreading code that is formed from an initial basic matrix to generate one spreading code of the ternary ZCD preferred pair codes, having a predetermined times the period and a pair code generator for generating the other spreading code of the ternary ZCD preferred pair codes by inverting even terms of the spreading code generated at the code period expander 130.

The code period expander 130 includes a serial/parallel converter 110, a reference clock generator 111, a distributor 112, a repeater 113, a partial block inverter 114, a switch control logic 115, a parallel/serial converter 116, a zero inserter 117, and a control logic 118.

The serial/parallel converter 110 converts an inputted serial code to a parallel signal by using a clock reference signal that is generated at the reference clock generator 111 and provides the parallel signal to the distributor 112.

The distributor 112 distributes the parallel signal from the serial/parallel converter 110 to the repeater 113.

The repeater 113 processes the parallel signal that is distributed from the distributor 112 to a repetitive form and provides the repetitive form to the partial block inverter 114.

The partial block inverter 114 selects and inverts some part (e.g., only ¼) of a whole block of the parallel signal of the repetitive form under switching control of the switch control logic 115 and provides the inverted form to the parallel/serial converter 116.

The parallel/serial converter 116 converts the parallel signal from the partial block inverter 114 to a serial signal and provides this serial signal to the zero inserter 117.

Then, the zero inserter 117 inserts zeros into the serial signal from the parallel/serial converter 116 under control of the control logic 118 to generate one of the preferred pair codes, which has zero correlation characteristic identical with the initially inputted serial code (the serial code that is initially inputted to the serial/parallel converter 112) and two times the period of the initially inputted serial code.

Here, zero correlation represents that side lobes of auto-correlation peak and cross correlation are 0, which is used for performance estimation of the spreading codes in the CDMA communications.

On the other hand, the output signal of the zero inserter 117 is applied to the pair code generator 150. In the pair code generator 150, all of even terms among the elements of the applied signal are inverted by an inverter 157 and the remaining terms are passed through the buffer 155 to generate the other pair code signal. At this time, the pair code signal generated at the pair code generator 150 is applied to the ternary ZCD code set generator 170 to generate ternary ZCD code sets having various ZCD, respectively.

That is, the code signal outputted from the pair code generator 150 is applied to an input code circulator 173 that is constructed by a number of delay flip-flops 171. Then, the code signal that is inputted to the delay flip-flop 171a of the input code circulator 173 is shifted to right by one bit to circulate. That is, the output of the final flip-flop 171b that is located at right end is fed back to the delay flip-flop 171a to circulate repeatedly.

On the other hand, signals outputted from TAP signals are coupled to the input code circulator 173 generate codes repeatedly under timely switching control of the time control switch logic 175. At this time, the outputted code signals function as the ternary ZCD code set (Ternary ZCD code set) in which side lobes near the peak of the auto-correlation and cross-correlation are zero within a predetermined duration equal to or shorter than (0.75N+1) chips.

Hereinafter, it will be described for the ternary ZCD preferred pair (TZPP) with zero correlation characteristic of (0.75N+1) chips and generation of the ternary ZCD code set having various ZCDs where a code period $N=4 \times 2^i (i=1,2,3, \ldots )$.

At first, an initial basic matrix G is formed as follows:

$$GA = \begin{bmatrix} + & z & + & z & + & z & - & z \\ + & z & + & z & - & z & + & z \\ + & z & - & z & + & z & + & z \\ - & z & + & z & + & z & + & z \end{bmatrix} \text{ or} \qquad \text{Eq. (1)}$$

$$GA = \begin{bmatrix} + & + & z & z & + & - & z & z \\ + & + & z & z & - & + & z & z \\ + & - & z & z & + & + & z & z \\ - & + & z & z & + & + & z & z \end{bmatrix}$$

Here, in the matrix GA or matrix GB, 1 and −1 are represented by (+) and (−), respectively, for the sake of convenience, and z represents a padding zero. Assuming that any one of the rows of the matrix GA or GB is a spreading code $C_8^{(a)}=(C_0^{(a)}, \Lambda, C_7^{(a)})=(e_0,z,e_1,z,e_2,z,e_3,z)$ or $(e_0,e_1,z,z,e_2,e_3,z,z)$ of a 8-chip period, other spreading code $C_8^{(b)}=(C_0^{(b)}, \Lambda, C_7^{(b)})=(v_0,z,v_1,z,v_2,z,v_3,z)$ or $(v_0,v_1,z,z,v_2,v_3,z,z)$ can be generated from $C_8^{(a)}$. At this time, the relation between $C_8^{(a)}$ and $C_8^{(b)}$ becomes $v_q=(-1)^q e_q$ (q=0,1,2,3). Here, a pair of the 8 chip period codes, $\{C_8^{(a)}, C_8^{(b)}\}$ have zero correlation of (0.75×8+1) chips, which are defined as an initial ternary ZCD preferred pair (TZPP).

Here, the ZCD is a successive duration in which the side lobes near the auto-correlation peak and the cross-correlation are 0, which represents that the side lobes near the auto-correlation peak and the cross-correlation are 0 within a local duration around the auto-correlation peak.

Next, it will be described for the expanding matrix for expanding the period of the TZPP to be two times longer.

When one code taken from $\{C_8^{(a)}, C_8^{(b)}\}$ consisting of the initial TZPP is inputted to the expanding matrix, any row taken from the outputted matrix is a expanded code $C_{16}^{(a)}$ having a 16-chip period that is two times the inputted code. Next, by inverting the signatures of the even terms of the code $C_{16}^{(a)}$ as $S_q^{(b)} = (-1)^q s_q^{(a)}$ (q=0,1, . . . , 15), $C_{16}^{(b)}$ is generated. Here, expanding operation of the period of TZPP is generalized as following Eq. (2).

That is, given any TZPP having a period m, $(C_m^{(a)}, C_m^{(b)})$, an expanding matrix DA or DB having row length of 2 m is consisted as follows:

$$DA = \begin{bmatrix} X & Z & Y & Z & X & Z & -Y & Z \\ X & Z & Y & Z & -X & Z & Y & Z \\ X & Z & -Y & Z & X & Z & Y & Z \\ -X & Z & Y & Z & X & Z & Y & Z \end{bmatrix} \text{ or } \quad \text{Eq. (2)}$$

-continued $$DA = \begin{bmatrix} V & W & Z & Z & V & -W & Z & Z \\ V & W & Z & Z & -V & W & Z & Z \\ V & -W & Z & Z & V & W & Z & Z \\ -V & W & Z & Z & V & W & Z & Z \end{bmatrix}$$

Here, the period is $$m = 4 \times 2^i, (i = 1, 2, 3, \ldots),$$

$$X = \left( c_0^{(a)}, \Lambda, c_{\frac{m}{8}-1}^{(a)}, c_{\frac{2m}{8}}^{(a)}, \Lambda, c_{\frac{3m}{8}-1}^{(a)} \right),$$

$$Y = \left( c_{\frac{4m}{8}}^{(a)}, \Lambda, c_{\frac{5m}{8}-1}^{(a)}, c_{\frac{6m}{8}}^{(a)}, \Lambda, c_{\frac{7m}{8}-1}^{(a)} \right),$$

$$V = \left( c_{\frac{2m}{4}}^{(a)}, \Lambda, c_{\frac{3m}{4}-1}^{(a)} \right),$$

$$W = \left( c_{\frac{2m}{4}}^{(a)}, \Lambda, c_{\frac{3m}{4}-1}^{(a)} \right),$$

and Z represents m/4 zeros. Also, DA is applied only to the matrix deviated from ±GA and DB is applied only to the matrix deviated from ±GB.

Any row of the ±DA or ±DB is $C_{2m}^{(a)} = (C_0^{(a)}, C_1^{(a)}, \Lambda, C_{2m-1}^{(a)})$. Using $C_{2m}^{(b)}$, $C_{2m}^{(b)} = (C_0^{(b)}, C_1^{(b)}, \Lambda, C_{2m-1}^{(b)})$ is generated. Also, $c_q^{(b)} = (-1)^q c_q^{(a)}$, (q=0,1, . . . ,2m-1). Then, $\{C_{2m}^{(a)}, C_{2m}^{(b)}\}$ is TZPP having zero correlation duration of (0.75×2m+1) chips. Therefore, for the period of N=4×2^i(i=0, 1,2,3, . . . ), TZPP $\{C_N^{(a)}, C_N^{(b)}\}$ having zero correlation duration of (0.75N+1) chips is generated.

Here, there is shown an example of a pair of codes $\{C_{16}^{(a)}, C_{16}^{(b)}\}$ having the period of 4×2²=16 chips and the zero correlation duration of 13 chips in following Eq. (3).

$$\left\{ \begin{array}{l} c_{16}^{(a)} = (++zz+-zz++zz-+zz) \\ c_{16}^{(b)} = (+-zz+-zz+-zz--zz) \end{array} \right\} \text{ or } \quad \text{Eq. (3)}$$

$$\left\{ \begin{array}{l} c_{16}^{(a)} = (+++-zzzz++-+zzzz) \\ c_{16}^{(b)} = (+-++zzzz+---zzzz) \end{array} \right\}$$

Next, there is shown an example of a pair of codes $\{C_{128}^{(a)}, C_{128}^{(b)}\}$ having the period of 128 chips and the zero correlation duration of 97 chips in following Eq. (4).

$$\left\{ \begin{array}{l} C_{128}^{(a)} = (A \quad B \quad A \quad -B \quad Z_{16} \quad A \quad B \quad -A \quad B \quad Z_{16} \quad A \quad B \quad A \quad -B \quad Z_{16} \quad -A \quad -B \quad A \quad -B \quad Z_{16}) \\ C_{128}^{(B)} = (C \quad D \quad C \quad -D \quad Z_{16} \quad C \quad D \quad -C \quad D \quad Z_{16} \quad C \quad D \quad C \quad -D \quad Z_{16} \quad -C \quad -D \quad C \quad -D \quad Z_{16}) \end{array} \right\} \quad \text{Eq. (4)}$$

Here, A=(+++-), B=(++-+), C=(+-+-), and Z represents 16 zeros.

Now, it will be described for procedure for generating TZCS a ternary ZCD code set consisting of M codes having ZCD equal to or less than (0.75N+1) chips for the period of 4×2^i(i=1,2,3, . . . ).

The TZCS consisting of M codes represents a set of M ternary codes having same ZCD, the ZCD being equal to or less than (0.75N+1) chips. The TZCS can be generated by chip-shift operation on the TZPP, $\{C_N^{(a)}, C_N^{(b)}\}$.

That is, where $T^1$ represents the counter-clockwise 1 chip-shifter, the TZCS of N chip period, consisting of M codes can be generated by a following equation (5).

$$\{C_N^{(a)}, C_N^{(b)}, T^\Delta[C_N^{(a)}], T^\Delta[C_N^{(b)}], T^{2\Delta}[C_N^{(a)}], T^{2\Delta}[C_N^{(b)}]\Lambda, \quad \text{Eq. (5)}$$
$$T^{(k-1)\Delta}[C_N^{(a)}], T^{(k-1)\Delta}[C_N^{(b)}], T^{k\Delta}[C_N^{(a)}], T^{k\Delta}[C_N^{(b)}]\}$$

Here, Δ represents chip-shift increment and k represents maximum available shift for a given code. Also, Δ and k are a positive integer and a non-negative integer, respectively, and their relation is surely $$|(k+1)\Delta| \le \left|\frac{3N}{8}+1\right|.$$

The relation between M and the ZCD of the newly generated code is expressed by a following equation (6).

$$M=2(k+1) \text{ and } ZCD=|2\Delta-1| \qquad \text{Eq. (6)}$$

Also, the total number of the codes of the ternary ZCD codes of 32, 62, 128, and 256 chips in a following table 1.

TABLE 1

| | ZCD | | | | | | | | | | | | | | | | | | |
|---|---|---|---|---|---|---|---|---|---|---|---|---|---|---|---|---|---|---|---|
| N | 3 | 5 | 7 | 9 | 11 | 13 | 15 | 17 | 19 | 21 | 23 | 25 | 27 | 29 | 31 | ... | 95 | ... | 193 |
| 32 | 12 | 8 | 6 | 4 | 4 | 2 | 2 | 2 | 2 | 2 | 2 | 2 | — | — | — | — | — | — | — |
| 64 | 24 | 16 | 12 | 8 | 8 | 6 | 6 | 6 | 4 | 4 | 4 | 2 | 2 | 2 | 2 | ... | — | — | — |
| 128 | 48 | 32 | 24 | 18 | 16 | 12 | 12 | 10 | 8 | 8 | 8 | 6 | 6 | 6 | 6 | ... | 2 | — | — |
| 256 | 96 | 64 | 48 | 38 | 32 | 26 | 24 | 20 | 18 | 16 | 16 | 14 | 12 | 12 | 12 | ... | 4 | ... | 2 |

Figure 4:
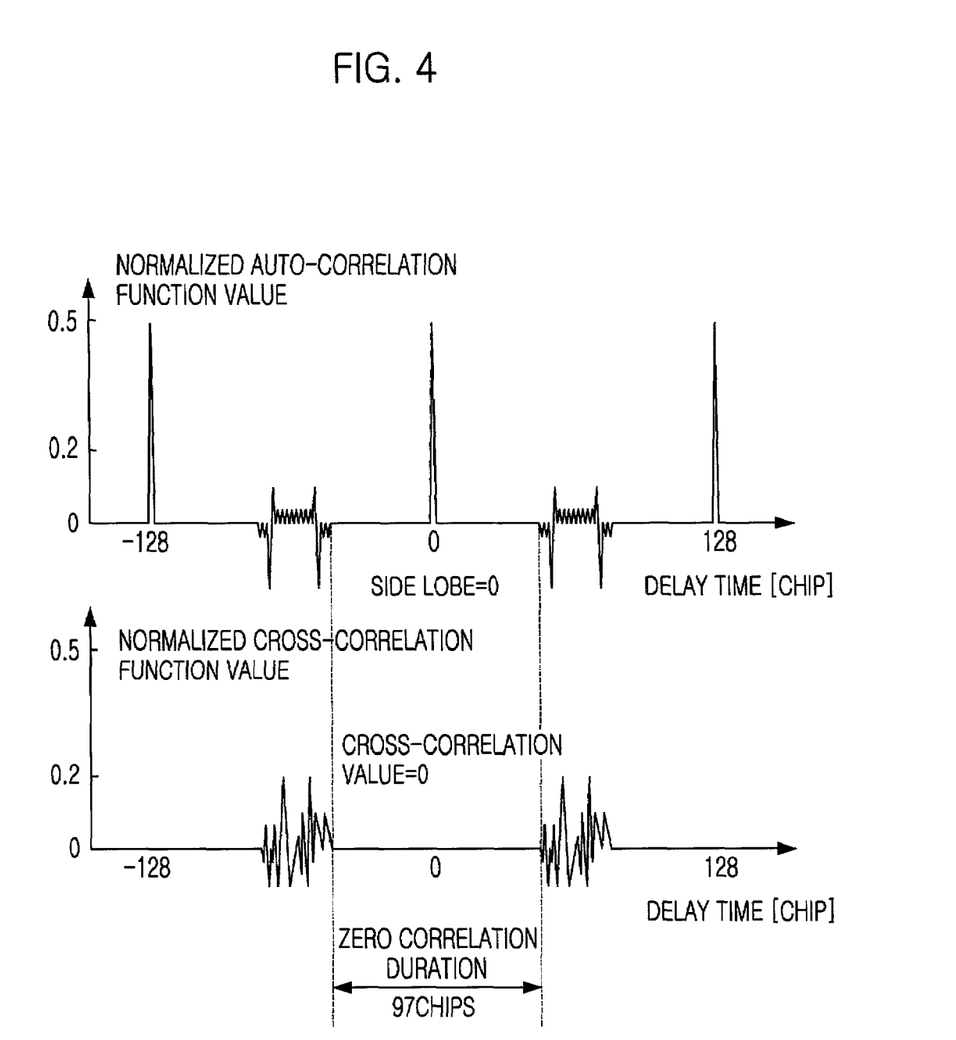
FIG. 4 illustrates auto-correlation characteristic and cross-correlation characteristic of spreading codes in accordance with the present invention.

FIG. 4 illustrates auto-correlation characteristic and cross-correlation characteristic of spreading codes in accordance with the present invention.

In FIG. 4, the duration within which the auto-correlation function value and the cross-correlation function value, of a pair of codes of a 128-chip period, are 0, i.e., the zero correlation duration is shown. In other words, during 97 chips corresponding to 0.75N+1 of 128 chips, the side lobes near the peak of the auto-correlation function and the cross-correlation between the two codes fall on 0.

Figure 5:
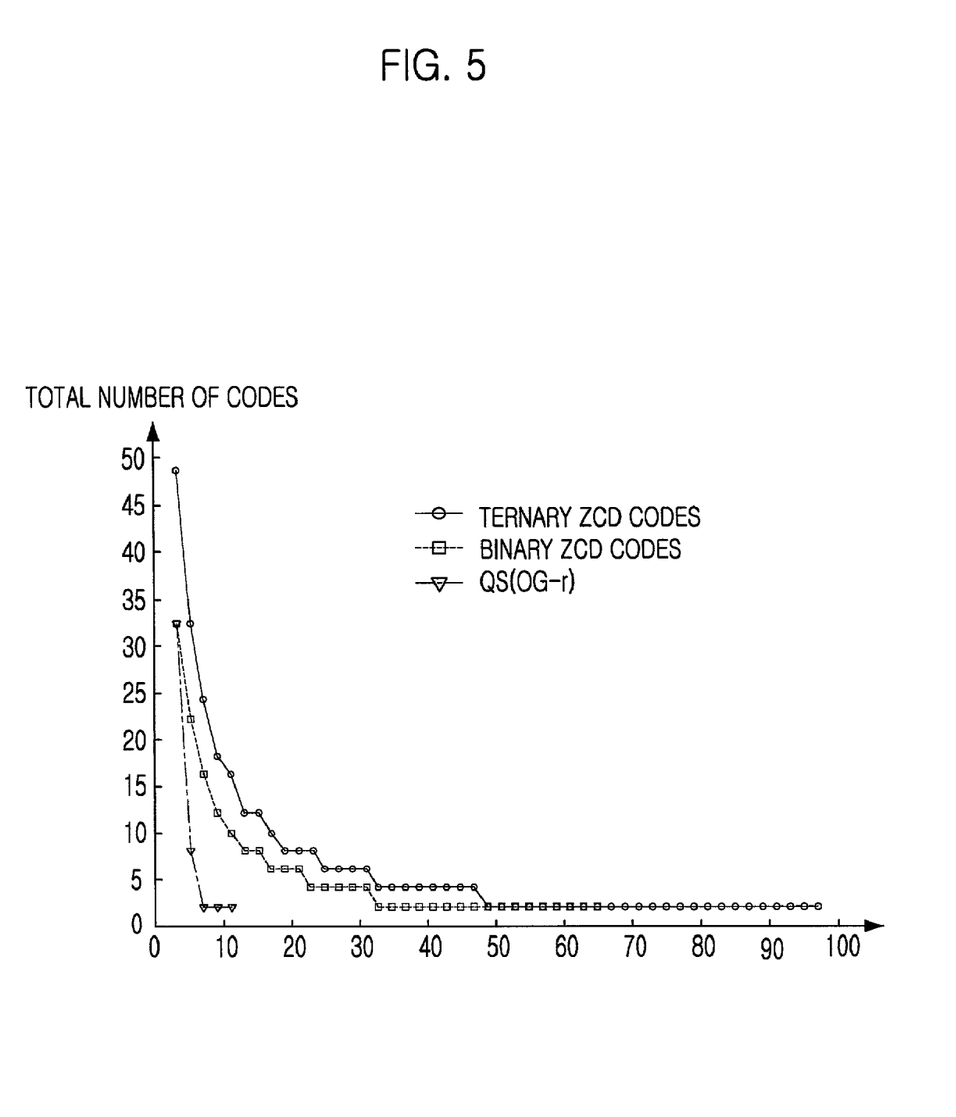
FIG. 5 is a graph for comparing the number of spreading codes versus zero correlation duration employed in the present invention with that of ternary ZCD codes and that of quasi-synchronous codes.

FIG. 5 is a graph for comparing the number of spreading codes versus zero correlation duration in the present invention with that of ternary ZCD codes and that of quasi-synchronous code.

As shown in FIG. 5, when the ZCD is equal to or longer than 3 chips, the above ternary ZCD codes produce much more codes than QS (OG-r) codes and ternary ZCD codes for a same ZCD. Therefore, because more codes can be obtained, more users can be accommodated in the CDMA communication system. Because of longer ZCD, quasi-synchronous operation available duration of the CDMA communication system increases.

Here, when the ternary spreading codes of the present invention are employed in the CDMA system, the CDMA system has wider quasi-synchronous operation duration than any conventional binary spreading codes have ever had. Also, the number of the spreading codes having a same ZCD is larger than any binary spreading codes have ever had. Therefore, when the ternary spreading codes of the present invention are assigned to channels of the CDMA system, respectively, orthogonal property between the spreading codes is retained for a some time duration even when chip synchronization between the codes is not acquired, as well as the channels are multiplexed.

Also, when the ternary spreading codes of the present invention are employed in the cellular system, the CDMA system can operates without synchronization between the codes in up-link within a cell and reduce the effect of multi-path by quasi-synchronous operation.

Further, the ternary spreading codes of the present invention can be used as an initial synchronization acquisition code related to a matched filter by using the characteristic of the zero side lobes over wide duration near the auto-correlation peak.

Further, the parts corresponding to zeros among the elements of the ternary spreading codes of the present invention can be substituted for by switching off operation in hardware implementation. In implementation of a matched filter of receiving part for dispreading, because tap coefficients corresponding the parts corresponding to zeros among the elements of the codes are zeros, the operands become zeros in those part and adders and multipliers to be coupled to the zero tap coefficients are not required so that the amount of total operations is reduced to make low power consumption of the matched filter.

Further, because the method for generating the ternary codes of the present invention, its hardware implementation is simple and successive expandability of the code period is facilitated. That is, the code period N can be expanded from 2 to infinite.

As described above, the method according to the present invention can be implemented in a program to be stored in a computer readable recording medium, for example, CD-ROM, RAM, ROM, floppy disk, hard disk, magneto-optical disk, etc.

When the ternary spreading codes of the present invention are employed in the CDMA system, the CDMA system has wider quasi-synchronous operation duration than any conventional binary spreading codes have ever had. Also, the number of the spreading codes having a same ZCD is larger than any binary spreading codes have ever had. Therefore, when the ternary spreading codes of the present invention are assigned to channels of the CDMA system, respectively, orthogonal property between the spreading codes is retained for a some time duration even when chip synchronization between the codes is not acquired, as well as the channels are multiplexed.

Further, when the ternary spreading codes of the present invention are employed in the down-link, the effect of multi-path is reduced by quasi-synchronous operation. Also, when the ternary spreading codes of the present invention are employed in the up-link, they can be assigned as spreading codes for users in a cell in code division as well as they reduce co-channel interference due to multiple-access. Therefore, system efficiency can be improved.

Further, the ternary spreading codes of the present invention can be used as an initial synchronization acquisition code related to a matched filter by using the characteristic of the zero side lobes over wide duration near the auto-correlation peak.

While the present invention has been shown and described with respect to the particular embodiments, it will be apparent to those skilled in the art that many changes and modifications may be made without departing from the spirit and scope of the invention as defined in the appended claims.

What is claimed is:

1. A method for generating ternary spreading codes for use in an apparatus for generating the ternary spreading codes with zero correlation duration, the method comprising the steps of:
    (a) generating ternary zero correlation duration preferred pair codes, in which the zero correlation duration of (0.75N+1) chips is retained, by expanding an N chip period of a code, N being a natural number; and
    (b) generating a plurality of ternary zero correlation duration code sets having zero correlation characteristic equal to or less than (0.75N+1) chips by shifting the generated ternary zero correlation duration preferred pair codes in chips.

2. The method as recited in claim 1, wherein the step (a) includes the steps of:
    (a1) forming a basic spreading code from an initial basic matrix;
    (a2) expanding the period of the formed basic spreading code to generate one of the ternary zero correlation duration preferred pair codes having zero correlation characteristic of (0.75N+1) chips with a predetermined time period; and
    (a3) inverting even terms of the generated one of the ternary zero correlation duration preferred pair codes to generated the other one of the ternary zero correlation duration preferred pair codes.

3. The method as recited in claim 1, wherein the generated ternary spreading codes are used as an initial code for synchronization acquisition based on a matched filter.

4. The method as recited in claim 1, wherein the generated ternary spreading codes are used for multiplexing of channels and chip synchronization between codes in a code division multiple access (CDMA) system.

5. The method as recited in claim 1, wherein the generated ternary spreading codes are used in up-link of a cellular system to make the cellular system operate without synchronization and are used in down-link of the cellular system to reduce multi-path clue to quasi-synchronous operation duration.

6. The method as recited in claim 1, wherein the generated ternary spreading codes are expanded by generating a expanding matrix and using each row or a row in which some parts of signatures of each row are inverted.

7. The method as recited in claim 1, wherein the generated ternary spreading codes are used in a low power consumption matched filter in which adders and multipliers, coupled to halves of zero tap coefficients of tap coefficients in hardware implementation of dispreading matched filter, are removed.

8. An apparatus for generating ternary spreading codes with zero correlation duration, the apparatus comprising:
    generating means for generating ternary zero correlation duration preferred pair codes, in which the zero correlation duration of (0.75N+1) chips is retained, by expanding a code N chip period of a code, N being a natural number; and
    generating means for generating a plurality of ternary zero correlation duration code sets having zero correlation characteristic equal to or less than (0.75N+1) chips by shifting the generated ternary zero correlation duration preferred pair codes in chips.

9. The apparatus as recited in claim 8, wherein the generation means for generating ternary zero correlation duration preferred pair codes includes:
    expanding means for expanding a period of a basic spreading code that is formed from an initial basic matrix to generate one of the ternary zero correlation duration preferred pair codes having zero correlation characteristic of (0.75N+1) chips with a predetermined time period; and
    generating means for inverting even terms of the generated one of the ternary zero correlation duration preferred pair codes to generate the other one of the ternary zero correlation duration preferred pair codes.

10. The apparatus as recited in claim 8, wherein the generated ternary spreading code is used as an initial code for synchronization acquisition based on a matched filter.

11. The apparatus as recited in claim 8, wherein the generated ternary spreading codes are used for multiplexing of channels and chip synchronization between codes in a code division multiple access (CDMA) system.

12. The apparatus as recited in claim 8, wherein the generated ternary spreading codes are used in up-link of a cellular system to make the cellular system operate without synchronization and are used in down-link of the cellular system to reduce multi-path due to quasi-synchronous operation duration.

13. The apparatus as recited in claim 8, wherein the generated ternary spreading codes are expanded by generating a expanding matrix and using each row or a row in which some parts of signatures of each row are inverted.

14. The apparatus as recited in claim 8, wherein the generated ternary spreading codes are used in a low power consumption matched filter in which adders and multipliers, coupled to halves of zero tap coefficients of tap coefficients in hardware implementation of dispreading matched filter, are removed.

15. A computer readable recording medium for recording a program for implementing, in an apparatus having a processor for generating ternary spreading codes with zero correlation duration, the program comprising the functions of:
    (a) generating ternary zero correlation duration preferred pair codes, in which the zero correlation duration of (0.75N+1) chips is retained, by expanding a N chip code period, N being a natural number; and
    (b) generating a plurality of ternary zero correlation duration code sets having zero correlation characteristic equal to or less than (0.75N+1) chips by shifting the generated ternary zero correlation duration preferred pair codes in chips.

16. The program as recited in claim 15, wherein the step (a) includes the steps of:
    (a1) forming a basic spreading code from an initial basic matrix;
    (a2) expanding the period of the formed basic spreading code to generate one of the ternary zero correlation duration preferred pair codes having zero correlation characteristic of (0.75N+1) chips with a predetermined time period; and (a3) inverting even terms of the generated one of the ternary zero correlation duration preferred pair codes to generated the other one of the ternary zero correlation duration preferred pair codes.

17. The program as recited in claim 15, wherein the generated ternary spreading codes are used as an initial code for synchronization acquisition based on a matched filter.

18. The program as recited in claim 15, wherein the generated ternary spreading codes are used for multiplexing of channels and chip synchronization between codes in a code division multiple access (CDMA) system.

19. The program as recited in claim 15, wherein the generated ternary spreading codes are used in up-link of a cellular system to make the cellular system operate without synchronization and are used in down-link of the cellular system to reduce multi-path clue to quasi-synchronous operation duration.

20. The program as recited in claim 15, wherein the generated ternary spreading codes are expanded by generating a expanding matrix and using each row or a row in which some parts of signatures of each row are inverted.

21. The program as recited in claim 15, wherein the generated ternary spreading codes are used in a low power consumption matched filter in which adders and multipliers, coupled to halves of zero tap coefficients of tap coefficients in hardware implementation of dispreading matched filter, are removed.

* * * * *